United States Patent [19]

Strong et al.

[11] Patent Number: 4,936,810
[45] Date of Patent: Jun. 26, 1990

[54] CROP THINNING ELEMENTS FOR AXIAL FLOW COMBINE

[75] Inventors: Russell W. Strong, Brugge, Belgium; William L. Harris, Paradise, Pa.

[73] Assignee: Ford New Holland, Inc., New Holland, Pa.

[21] Appl. No.: 348,348

[22] Filed: May 5, 1989

[51] Int. Cl.⁵ .............................................. A01F 12/20
[52] U.S. Cl. .......................................... 460/69; 460/70
[58] Field of Search .............................. 460/59, 66–72, 460/121, 122

[56] References Cited

U.S. PATENT DOCUMENTS

| | | | |
|---|---|---|---|
| 3,982,548 | 9/1976 | Stamp et al. | 460/70 X |
| 4,124,032 | 11/1978 | Cowan, Jr. et al. | 460/66 |
| 4,164,947 | 8/1979 | Wilson | 460/71 X |
| 4,178,943 | 12/1979 | West | 460/68 |
| 4,230,130 | 10/1980 | Stariert | 460/69 X |
| 4,362,168 | 12/1982 | Hengen et al. | 460/68 X |
| 4,399,825 | 8/1983 | Raineri | 460/69 X |
| 4,505,279 | 3/1985 | Campbell et al. | 460/68 X |

FOREIGN PATENT DOCUMENTS

0216060  7/1986  European Pat. Off. .

Primary Examiner—Thuy M. Bui
Attorney, Agent, or Firm—Larry W. Miller; Frank A. Seemar; Darrell F. Marquette

[57] ABSTRACT

An axial flow harvesting machine having at least one rotor operable within a casing to thresh and separate grain from straw material is disclosed wherein the rotor has an infeed portion, an adjacent threshing section, and a rearward separating section. The rasp bars on the threshing section immediately adjacent to the infeed portion are replaced by crop thinning elements cooperable with the casing to thin the straw material before being subjected to the threshing action of the remaining rasp bars in the threshing section.

4 Claims, 6 Drawing Sheets

CROP THINNING ELEMENTS FOR AXIAL FLOW COMBINE

BACKGROUND OF THE INVENTION

This invention relates generally to axial flow harvesting machines and, more particularly, to rotor threshing and separating configurations to improve the operating efficiency of axial flow combine harvesters.

In conventional combine harvesters, crop material is fed between a threshing cylinder and an associated concave, whereby it is threshed over a comparatively short distance, a typical concave extending over an arc of about 100°. In axial flow machines, crop material is subjected to a much longer threshing and separating action than in a conventional machine of comparable size and, therefore, the efficiency of axial flow machines is greater because grain losses are reduced.

Nevertheless, there are problems associated with axial flow machines which mitigate against this basic advantage. For example, the power requirement of an axial flow machine is greater than that of a comparable conventional machine due to the sustained threshing and separating action and difficulties can be experienced when a given machine is used to harvest different types of crop and in different conditions of crop. Clearly, it is highly desirable to provide a basic machine which can be adopted with ease to handle different types and conditions of crop. It is essential to keep grain losses to an acceptable minimum and also to achieve a smooth flow of crop material through the threshing and separating mechanisms. In the latter respect, if an amount of crop material or a piece of foreign matter ceases moving through the threshing and separating sections, a major obstruction can soon accumulate resulting in jamming or plugging of the rotor. The consequences of which can be serious in terms of down-time of the machine.

SUMMARY OF THE INVENTION

It is an object of the present invention to provide an axial flow harvesting machine which can be adapted to suit varying crops and crop conditions and yet optimize the operation of the machine in each configuration.

According to a first aspect of the present invention there is provided an axial flow harvesting machine comprising at least one generally cylindrical rotor mounted within a casing and operable, in conjunction with the casing, to thresh and separate grain from straw material, and a plurality of mounting means permanently provided at predetermined positions over the periphery of the rotor, characterised in that the height of each mounting means is less than the height of members mountable thereon for operation on the crop material in use of the machine.

The basic concept from which springs the first aspect of the present invention is that of providing mounting means with low profiles which give rise to two distinct advantages which represent significant advances in the art. The first advantage, due to the low profile nature of each mounting means, is that it is not necessary always to mount thereon some form of member for operating on the crop material because the profile of the mounting means is such that it will not in any way detract from the smooth flow of crop material basically axially of the or each rotor. The second advantage is that when certain members for operating on the crop material, such as rasp bars, are mounted on the mounting means, these members can be of a depth such that any securing means, such as bolts, can be accommodated within the depth of that member such as not to be exposed to crop material moving relative thereto. Such movement normally results in heavy wear of the head of a securing bolt, for example, with the result that often it is impossible to operate on that head in the normal way in order to remove the bolt in order to change a rasp bar or other member for operating on the crop material.

In terms of the first aspect of the present invention enabling mounting means to remain unused without in any way impeding flow of crop material is in distinct contrast to known arrangements in which permanent mounting means are provided such as, for example, the arrangement disclosed in EP-A-0216060, in which all of the mountings must be occupied by crop operating members.

According to a second aspect of the present invention there is provided an axial flow harvesting machine comprising at least one generally cylindrical rotor mounted within a casing and operable, in conjunction with the casing, to thresh and separate grain from straw material, and a plurality of mounting means permanently provided at predetermined positions over the periphery of the rotor, characterised in that the mounting means have mounting surfaces oriented in a predetermined manner, whereby when members are mounted thereon for operating on the crop material, those members are automatically oriented in the correct manner.

The mounting means may be separate members which are attached to the surface of the rotor, such as by welding, or the mounting means may be formed integrally with the rotor either as indentations or raised portions of the surface of the rotor. This aspect of the invention is particularly advantageous when the position of so-called "thinning" elements are provided, which elements are often required in order to maintain the mat of crop material in a thinned or non-compacted state in order that the crop material is relatively loose in order to facilitate the threshing and separating of grain therefrom. Such thinning elements are normally required when harvesting rice, for example. The thinning elements are usually in the form of a rod which requires careful mounting on the rotor in order that it extends in a direction generally rearwardly of the rotor and also in a direction in which the rod trails with respect to the direction of rotation of the rotor. If permanent mounting means are provided each of which has a mounting surface correctly oriented to achieve this mounting, then it is a simple matter to offer a thinning element to such a mounting surface and attach the same to the rotor without requiring any fine adjustment in order to achieve the desired orientation.

According to a third aspect of the present invention there is provided an axial flow harvesting machine comprising at least one rotor operable within a casing to thresh and separate grain from straw material, the rotor comprising an infeed portion operable to feed crop material to the main body of the rotor, a threshing section and a separating section, the threshing section comprising a plurality of removable rasp bars, characterised in that the rasp bars of the threshing section immediately following the infeed portion are replaceable by crop thinning members.

This third aspect of the present invention provides a smooth function of the harvesting machine even when uneven feeding is taking place and when handling damp and tough crops. The replacement of the normal forward threshing elements with thinning elements is a readily accomplished modification of the rotor which can still operate in a standard chamber which is optimized for normal conditions and yet allow the machine to operate satisfactorily in harvesting difficult crops. It is known to provide a dedicated thinning area or chamber immediately before the threshing section but this increases the overall length of the rotor; known to provide thinning elements in the feed-in portion; and known to provide thinning elements between conventional rasp bars, such as from U.S. Pat. Nos. 3,664,100, 4,136,704, 4,178,943 and 4,362,168.

BRIEF DESCRIPTION OF THE DRAWINGS

An axial flow combine harvester in accordance with the present invention will now be described in greater detail, by way of example, with reference to the accompanying drawings, wherein.

DETAILED DESCRIPTION OF THE PREFERRED EMBODIMENT

The terms "grain", "straw", and "tailings" are used principally throughout this specification for convenience and it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left", and "right", when used in connection with the combine harvester and/or components thereof are determined with reference to the direction of forward operative travel of the combine harvester but again, should not be construed as limiting.

Figure 1:
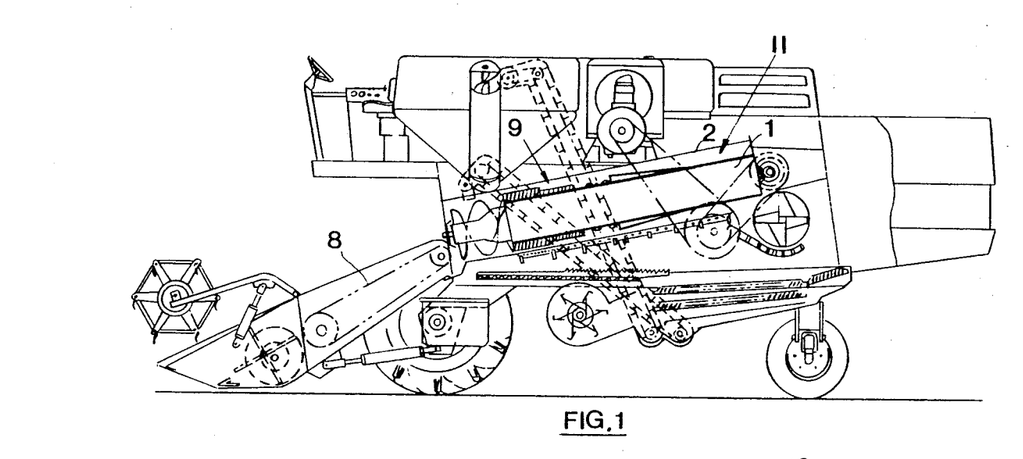
FIG. 1 is a diagrammatic side view of the combine harvester.
Figures 3, 18:
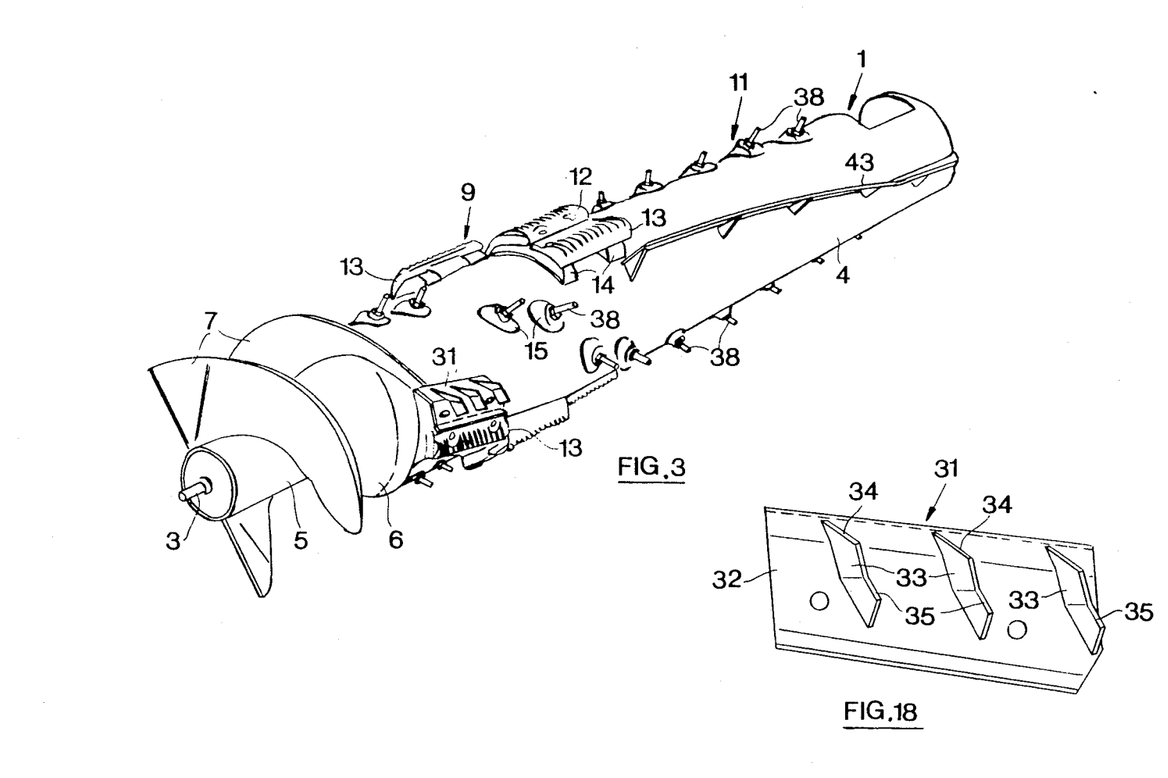
FIG. 3 is a perspective view of the rotor of FIG. 2 showing members for operating on the crop material mounted thereon.
FIG. 18 is a plan view of an alternative element for operating on crop material.
Figure 4:
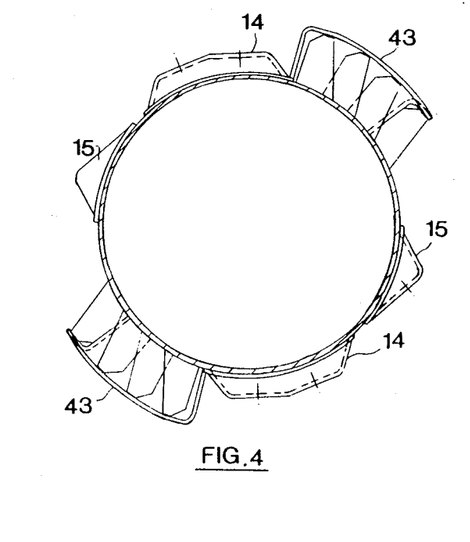
FIG. 4 is a section on the line IV—IV of FIG. 2.
Figure 5:
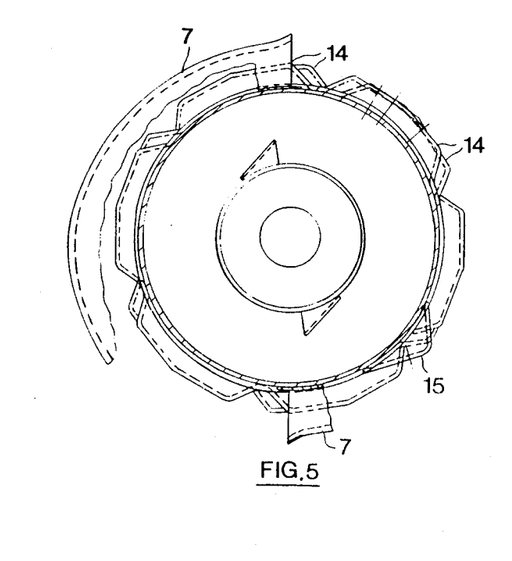
FIG. 5 is a partial cross-sectional view taken along the line V—V of FIG. 2, showing portions of the rotor as seen in end view in the direction of arrow F.

Turning now to FIG. 1 of the accompanying drawings, the basic machine is well known and is described, for example, in GB-A-1399601, the description of which is herein incorporated by reference. As described in GB-A-1399601, the combine harvester has a twin threshing and separating mechanism by way of right-hand and left-hand threshing and separating units each comprising a generally cylindrical rotor 1 mounted within a common, and generally correspondingly shaped, chamber 2. The inner surface of the chamber 2 is provided with helical fins in order to impart a helical and generally axial flow of crop material along the respective rotors 1 as is well known. Each rotor 1 is mounted for rotation on a forward and rearward stub shaft 3, of which only the forward stub shaft is shown in FIG. 3 of the drawings. The main body of each rotor 1 is a cylindrical tube 4 mounted on discs (not shown) supported on the respective stub shafts, and the forward end of each rotor is provided with an infeed section having a portion 5 of reduced diameter and a conical portion 6 which provides a transition between the portion 5 and the main body 4 of the rotor. A pair of auger flights 7 is provided at the infeed section 5, 6 of each rotor 1 which serves to transfer crop material from the top end of a crop conveyor 8 (FIG. 1) to the respective rotors 1.

Each rotor 1 has a threshing section 9 immediately following the infeed section 5, 6, and the threshing section is followed by a separating section 11. It is conventional to provide rasp bars in the threshing section of a rotor and separating bars in the separating section, the form of the separating bars differing from the rasp bars. The present rotors 1 are no exception to this and in order to provide for the provision of rasp bars 12 and 13 (seen generally in FIG. 3 and in greater detail in FIGS. 9-13) rasp bar mounts 14 are provided at predetermined positions around the periphery of the threshing section of each rotor 1 in the threshing section. The rasp bar mounts 14 are provided in pairs and further mounts 15 are also provided around the periphery of the rotor in predetermined positions both in the threshing section and the separating section of each rotor 1.

Figure 7:
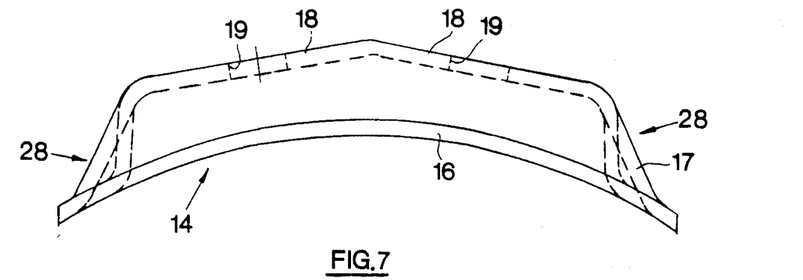
FIG. 7 is a side view of mounting means for rasp bars.
Figure 8:
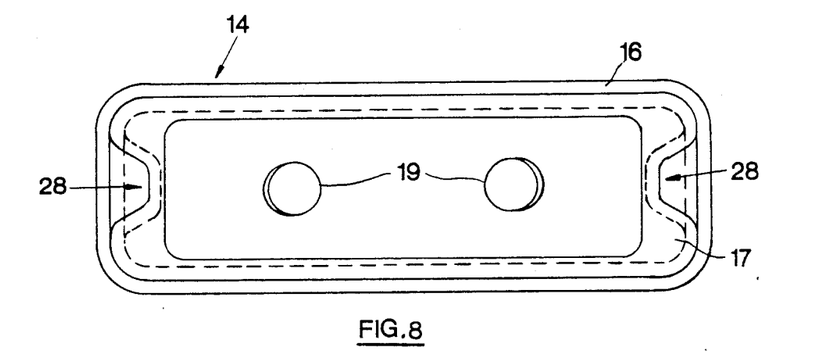
FIG. 8 is a plan view of FIG. 7.
Figure 13:
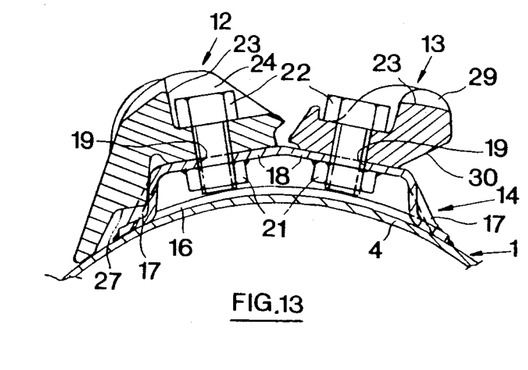
FIG. 13 is a section through part of the rotor of FIG. 2 showing a leading rasp bar and a trailing rasp bar mounted on common mounting means.
Figure 14:
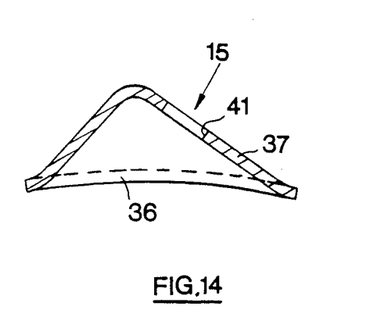
FIG. 14 is a cross sectional view of mounting means for a crop thinning element.
Figure 15:
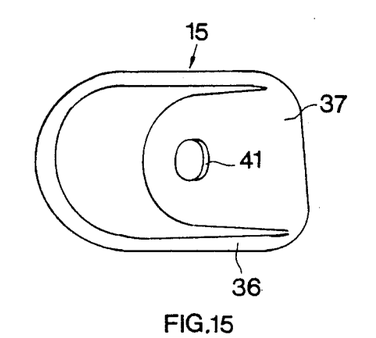
FIG. 15 is a plan view of the mounting means of FIG. 14.

Referring more specifically to FIGS. 7, 8 and 13, each rasp bar mount 14 is preformed and is an elongated rectangle as seen in plan view and comprises an arcuate base 16 conforming to the periphery of the rotor on which each mount is secured by welding or other means. An actual rasp bar mounting member 17 is provided on the base 16 and has two inclined surfaces 18 which are apertured at 19. Weld nuts 21 are provided in alignment with each aperture 19 on the underside of each mounting surface 18 as shown in FIG. 13. It will be seen that the overall height of each rasp bar mount 14 is relatively small so that each mount has a very low profile such that it will not interfere with the smooth flow of crop material relative to the rotor in use of the combine harvester even if no rasp bar is mounted thereon. In this respect, the corners of the mounting members 17 and bases 16 are rounded so as not to present any sharp edge to the crop material.

Figure 2:
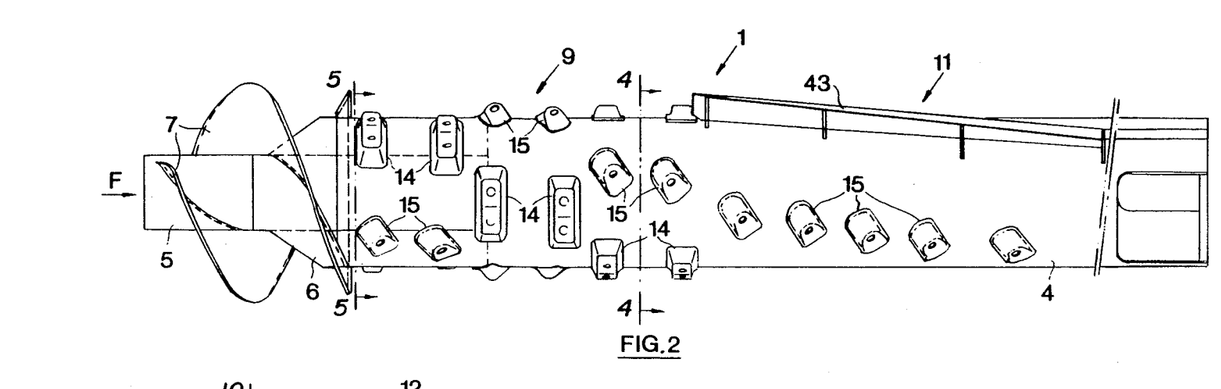
FIG. 2 is a side view of one of the two rotors of the combine harvester of FIG. 1 without any members for operating on the crop material shown mounted thereon.

As already mentioned, the rasp bar mounts 14 are provided in pairs and each pair may support a pair of rasp bars 12 and 13, the rasp bars 12 being leading rasp bars and the rasp bars 13 trailing rasp bars, with respect to the flow of crop material thereover. The angle between the mounting surfaces 18 of each rasp bar mount 14 is 160° in the illustrated embodiment and is related to the diameter of the rotor used. Indeed, each inclined surface 18 is generally perpendicular to the corresponding radius of the rotor drawn through the aperture 19 provided in said surface 18. The foregoing has been found to give a very satisfactory performance, without being critical however. The rasp bar mounts 14 of a given pair are welded or otherwise attached to each rotor main body 4 in an offset manner as seen in FIG. 2 of the drawings in order to incline the rasp bars 12 and 13 relative to the axis of each rotor 1 in order to assist in the helical movement of crop material around and along the rotor.

It should be noted that each rasp bar 12 and 13 is relatively deep compared to known rasp bars so as to compensate for the low profile (height) of the rasp bar mounts 14 in order that there is the optimal radial clearance between the rasp bars and the inner surfaces of the respective chambers 2. This combination of rasp bar and rasp bar mounts gives rise to one important feature of the present invention, namely that the heads of bolts 22 securing the rasp bars 12 and 13 to the respective weld nuts 21 are located below (as seen in FIG. 13) the lowermost operative surfaces 23 of the rasp bars which are in fact the surfaces between conventional raised fins or rasps 24, 29 of the rasp bars. Thus, the heads of the bolts 22 are not contacted by crop material in operation of the combine harvester and are thus not subjected to abrasive wear which is the case with existing designs resulting, in many instances, in making it impossible to remove bolts by applying a spanner to the heads thereof in view of the severe wearing away of the latter.

Figure 9:
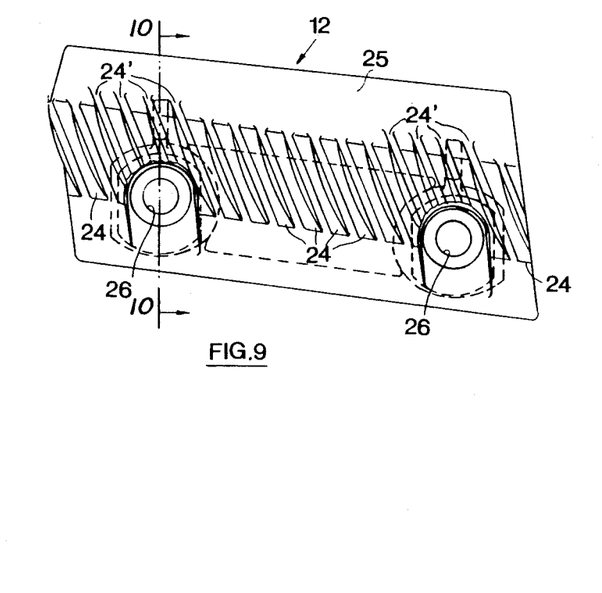
FIG. 9 is a plan view of a leading rasp bar.
Figure 10:
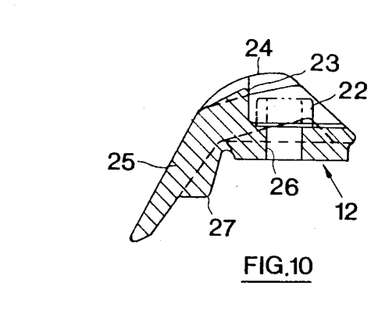
FIG. 10 is a section on the line X—X of FIG. 9.
Figure 11:
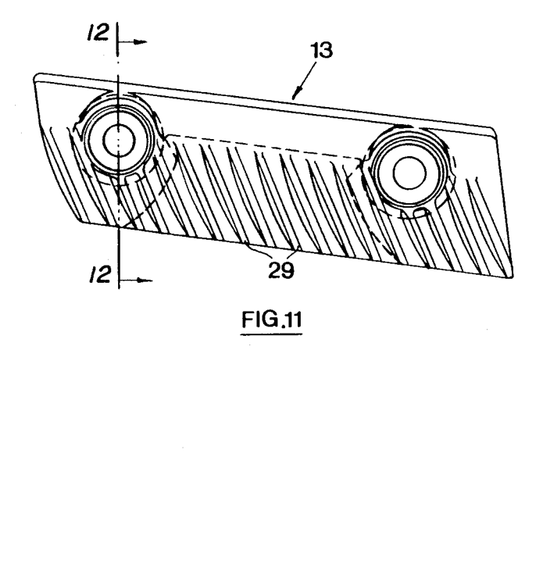
FIG. 11 is a plan view of a trailing rasp bar.
Figure 12:
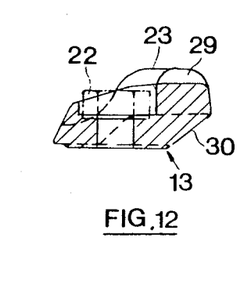
FIG. 12 is a section on line XII—XII of FIG. 11.

Looking in greater detail at the leading rasp bars 12, each is provided with a lead-in portion or ramp 25 which will be seen from FIG. 13 of the drawings to extend to the periphery of the associated rotor 1 along its entire forward edge in order to close the gap between the rasp bar and the rotor so that there is no likelihood of crop material becoming trapped therein and building up so as eventually to plug the rotor. The lead-in portion 25 of each leading rasp bar 12 is smooth and the fins or rasps 24 are provided along the upper edge of this lead-in portion. Each rasp bar 12 is provided with two apertures 26 to receive the securing bolts 22, these apertures being provided through portions of the finned area of the rasp bar. In order to compensate for this diminution of the operative portion of the rasp bars 12, the fins 24 are extended forwardly at 24' in the area of the apertures 26 as seen in FIG. 9 of the drawings.

In order to mount a leading rasp bar across a pair of mounts 14, it is necessary merely to offer the rasp bar to these mounts and apply bolts 22 through the apertures 26 in the rasp bar and tighten the bolts into the respective weld nuts 21. In order to assist in the basic location of a rasp bar 12, the latter is provided with a pair of extensions 27 on the back of the lead-in portion 25, which extensions are received in the respective indentations or dimples 28 in the adjacent edge of each mount 14. In this respect, each of the opposed and narrower sides or edges of the mounts 14 are provided with such an indentation or dimple 28 in order to avoid the need to ensure that a mount is the correct way round before attaching it to the rotor main body 4. The indentation 28 receiving one of the extensions 27 of a rasp bar 12 moreover provides an impact surface for more direct transfer of crop material impact forces on the lead-in portion 25 of the rasp bar 12 to the mounts 14. As such, less shearing forces are to be expected in the bolts 22 securing the rasp bars 12 to the mounts 14.

Turning now to the trailing rasp bars 13, these are of a different shape from the leading rasp bars 12, primarily because they do not require to have a lead-in portion and thus they comprise a basic rasp bar body provided with fins or rasps 29 and again, emphasis is laid on the fact that the rasp bars 13 are of a greater overall depth than conventional rasp bars in order that the heads of the bolts 22 can be located below the surfaces 23 inbetween the fins 29.

Figure 6:
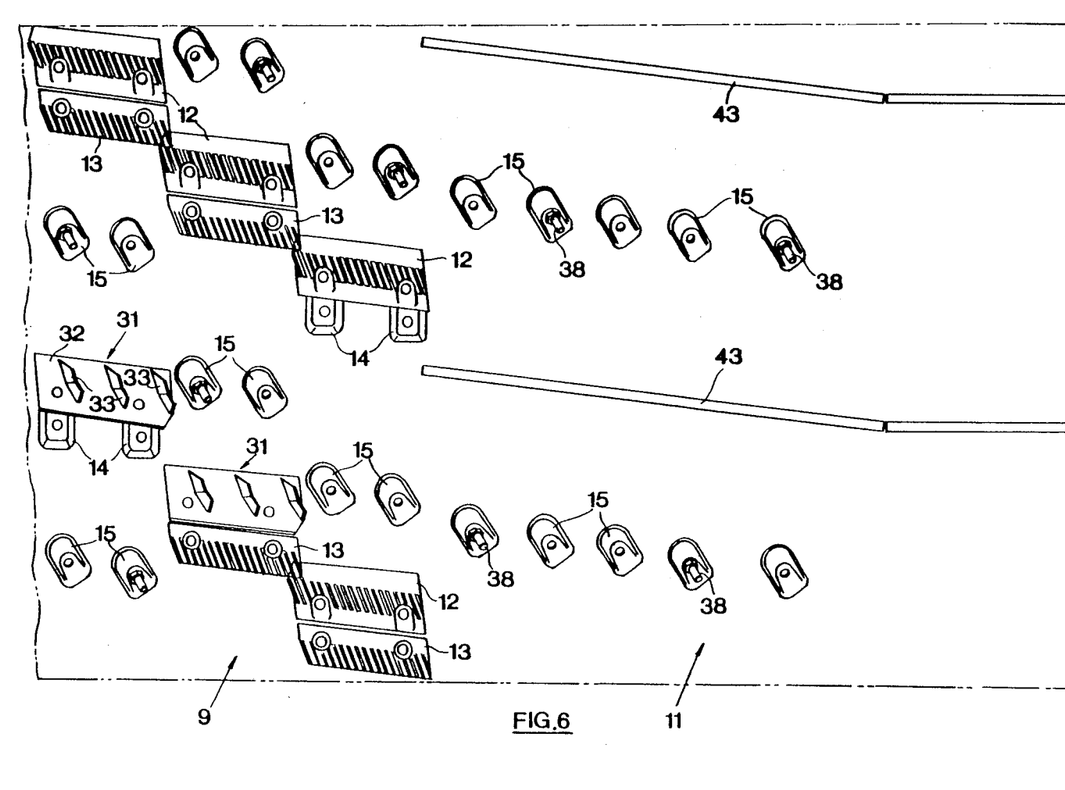
FIG. 6 is a development of the rotor of FIG. 2 showing illustrative arrangements of different members for operating on crop material.

As seen in FIG. 6 of the drawings, the trailing rasp bar 13 of one pair of rasp bars ]ls arranged to overlap, both axially and circumferentially of the rotor, the leading rasp bar 12 of an adjacent pair of rasp bars. The rear edge of each trailing rasp bar 13 is therefore cut away at 30 in order to accommodate the leading rasp bar 13 of an adjacent pair of rasp bars 12, 13. This feature is more fully described in co-pending Application no.

As also illustrated in FIG. 6 of the drawings, the provision of permanent mounts 14 and 15 for crop operating elements enables the format of a given rotor to be modified in order to suit various crop types and crop conditions. The arrangement illustrated in FIG. 6 of the drawings is merely by way of giving examples of the different types of crop operating members which may be employed and does not necessarily illustrate one format of rotor which may be used. As regards the mounts 14, it will be seen that these may be fitted with rasp bars 12 and 13, as already described, although one or more leading or trailing rasp bars ma{be omitted if desired in order to reduce the threshing action which is usually desirable when harvesting beans, for example. Aternatively, one or more leading rasp bars 12 may be replaced by a crop operating element 31 (FIG. 18) which is a composite thinning element in the sense that it serves to cut or thin the mat of crop material prior to it being threshed in order that the threshing operation can be optimised. The thinning elements 31 comprise a base plate 32 on which a plurality of blades 33 are mounted which have a lead-in edge 34 and a generally V-shaped top edge 35. It will be appreciated that other types of thinning elements may be provided as required.

Figure 16:
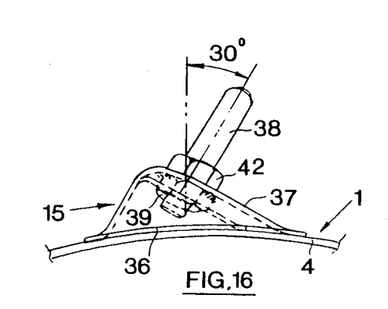
FIG. 16 is a side view of the mounting means of FIGS. 14 and 15 showing a crop thinning element mounted thereon.
Figure 17:
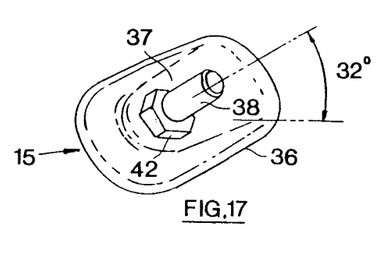
FIG. 17 is a perspective view of FIG. 16.

Turning now more specifically to FIGS. 16 and 17, the further mounts 15 are illustrated and will be seen to comprise an arcuate base 36 which, as with the base 16 of the mounts 14, conforms to the periphery of the associated tube 4 of the rotor 1. As seen in plan view this base 36 of each further mount 15 is also an elongate rectangle and is provided with an actual mounting surface 37 for a crop operating member in the form of a thinning rod 38 which is threaded at one end in order to be received by a weld nut 39 provided on the underside of the mounting surface 37 in alignment with an aperture 41 therein. The thinning rods 38 need to be mounted both so as to trail with respect to the direction of rotation of the associated rotor 1 and also to point towards the rear end of the rotor. Thus, the mounting surface 37 is inclined n two planes and in the illustrated embodiment the inclination in one plane is such as to impart a trailing angle of 30° for each thinning rod 38, and an angle of 32° towards the rear end of the rotor.

The thinning rod 38 is inclined rearwardly with an angle of 30° when seen in the direction of rotation and with respect to the radius of the rotor 1 passing through the bottom end of said thinning rod 38, as seen in FIG. 16. The angle of 32° is the angle between the longitudinal axis of the further mount 15 and the diametral plane of the rotor which that axis meets, as illustrated in FIG. 17 It should be appreciated that these angles of 30° and 32°, though of primary importance, are not critical. Each thinning rod 38 is provided with an hexagonal flange 42 immediately adjacent the threaded end portion in order that a spanner can be used to mount and dismount the rod in a mount 15. In this respect, a socket spanner can be used which is particularly advantageous in cases where the separating concaves are not removable because it is possible to mount and dismount the thinning rods through the mesh of those concaves which is a dinstinct advantage. Otherwise, the rotor 1 and/or casing 2 has to be removed for servicing said thinning rods. In machines where the separator concaves are hingedly attached to the rotor casing 2, then there is no problem in this respect. It is normal to provide removable threshing concaves.

As already mentioned, and as seen in FIGS. 2, 3 and 6, a number of further mounts 15 are disposed around the periphery of each rotor 1 and FIGS. 3 and 6 illustrate the provision of thinning rods 38 on some of these mounts and not on others. Again, the illustrated arrangement in this respect is merely by way of example but serves to show that a desired format of thinning rods can be used without any fear of the unused mounts 15 interfering in any way with the flow of crop material because, as with the mounts 14, the further mounts 15 have a low profile and rounded edges. In the separating section of each rotor 1, there are also provided conventional separate bars 43 as well as a number of further mounts 15.

It will be appreciated that the provision of the low profile mounts 14 and 15, the overall height of which is less than the overall height of the crop operating members mounted thereon affords a significant advance in the art in as much as it does not matter whether such mounts are used or not because any unused mount will not interfere with the smooth flow of crop material through the threshing and separating sections of the combine harvester. Another advantage is the shielding of the means securing the crop operating members to the mounting means in order that they are not subjected to wear, and a further advantage is the quick attachment of the crop operating members to the mounting means. In the latter respect, this means that the operator need only spend a relatively short time in altering format of the rotor in order to suit a different crop material or condition of crop material. The mounting means 14 and 15 are arranged so as to distribute the load thereon occasioned by the crop material over the surface of the rotor for increased strength.

The installation and removal of the thinning rods 38 is also accomplished very quickly and, more importantly with an assurance as to the correct orientation of the rods. As explained, the thinning rods 38 can be removed and assembled without the need to dismantle the rotor because they can be worked upon through the mesh of a separator concave if this is not made removable or hinged to the rotor casing. The ability to place thinning rods 38 at a relatively large number of positions over the rotor is also a distinct advantage afforded by the present invention.

As regards the aspect of the present invention in which normal threshing rasp bars can be replaced by thinning members 31, this gives rise to a smooth rotor function even in severe crop conditions without having to consider the provision of a separate thinning chamber.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form.

Having thus described the invention, what is claimed is:

1. In an axial flow harvesting machine having at least one rotor rotatably operable within a casing to thresh and separate grain from straw material, said at least one rotor including an infeed portion operable to feed crop material to the main body of said at least one rotor, a threshing section adjacent the infeed portion and having a plurality of removable rasp bars mounted on said main body to engage said straw material, and a separating section adjacent said threshing section to effect a removal of grain from said straw material, the improvement comprising:

the rasp bars of the threshing section immediately adjacent to the infeed portion are replaceable by crop thinning elements cooperable with said casing.

2. The harvesting machine of claim 1 wherein the rasp bars are mounted on mounting means affixed to said main body, the crop thinning elements having a base plate on which at least one agitator blade is mounted, said crop thinning elements being mounted on corresponding said mounting means adapted for detachable connection of said rasp bars in lieu of said crop thinning elements.

3. The harvesting machine of claim 2 wherein said mounting means immediately adjacent to said infeed portion having a mounting surface inclined to orient an attached crop thinning element in a direction which both trails with respect to the direction of rotation of said at least one rotor and extends toward said seperating section.

4. The harvesting machine of claim 3 wherein each said crop thinning element is threaded into the corresponding said mounting means to facilitate the detachment thereof from said at least one rotor.

* * * * *